United States Patent
Weber et al.

(10) Patent No.: US 7,982,580 B2
(45) Date of Patent: Jul. 19, 2011

(54) HIGH VIBRATION THIN FILM RTD SENSOR

(75) Inventors: Holger Weber, Babenhausen (DE);
 Ulrich Thiel, Moembris (DE); Dirk Willy Bauschke, Shakopee, MN (US)

(73) Assignee: Rosemount Inc., Eden Prairie, MN (US)

( * ) Notice: Subject to any disclaimer, the term of this patent is extended or adjusted under 35 U.S.C. 154(b) by 603 days.

(21) Appl. No.: 12/156,144

(22) Filed: May 30, 2008

(65) Prior Publication Data

US 2009/0296781 A1 Dec. 3, 2009

(51) Int. Cl.
 *H01C 7/02* (2006.01)
(52) U.S. Cl. ............................... 338/28; 29/612
(58) Field of Classification Search .............. 338/25, 338/28, 7, 13; 374/120, 158, 185, 208; 29/610–612
 See application file for complete search history.

(56) References Cited

U.S. PATENT DOCUMENTS

| | | | |
|---|---|---|---|
| 4,509,669 A * | 4/1985 | Elliesen | .................. 227/130 |
| 4,575,705 A | 3/1986 | Gotcher | |
| 4,937,552 A | 6/1990 | Lam | |
| 5,030,294 A | 7/1991 | Burley | |
| 5,309,133 A * | 5/1994 | Berger et al. | ................ 338/22 R |
| 5,632,557 A | 5/1997 | Simons | |
| 5,674,009 A | 10/1997 | Stark | |
| 6,059,453 A | 5/2000 | Kempf et al. | |
| 6,305,841 B1 * | 10/2001 | Fukaya et al. | ................ 374/185 |
| 6,762,671 B2 * | 7/2004 | Nelson | ............................ 338/25 |
| 2007/0104247 A1 | 5/2007 | Takahashi | |
| 2008/0036569 A1 | 2/2008 | Houben et al. | |
| 2008/0080592 A1 | 4/2008 | Houben et al. | |

OTHER PUBLICATIONS

International Search Report and Written Opinion, Aug. 28, 2009, 11 pages.
"Thermoguss 2000", from http://www.patscheider.de/tg20001eng.html, visited Nov. 3, 2007 (2 pages).
"Pulsar Chemical Co.—Coating—High Temperature", from http://www.pulsar.com.tr/sub_en/coating_high_temperature.php, visited Nov. 3, 2007 (4 pages).

* cited by examiner

*Primary Examiner* — Kyung Lee
(74) *Attorney, Agent, or Firm* — Kinney & Lange, P.A.

(57) ABSTRACT

A temperature sensor capable of operation in high vibration environment includes a sensor sheath mounted at the distal end of a mineral insulated cable. A resistance temperature detector (RTD) sensing element is connected to leads of the cable within the sheath. The sheath is filled at least partially with a ceramic thermal adhesive.

19 Claims, 1 Drawing Sheet

HIGH VIBRATION THIN FILM RTD SENSOR

BACKGROUND

The present invention relates to temperature sensors, and in particular to a temperature sensor capable of operating in high vibration environments with improved accuracy and a high temperature range.

The temperature of a process fluid in an industrial process is typically measured by a temperature sensor or probe that is positioned in the fluid. The temperature sensor may use a thermocouple or a resistance temperature detector (RTD) to produce an electrical signal that is a function of temperature.

A thermocouple makes use of two dissimilar metals with different Seebeck coefficients. The thermocouple generates a voltage based upon a temperature difference between the thermocouple junction and a reference junction. The thermocouple offers a wide temperature operating range (typically from 0° C. to 1450° C.), and does not require a power source to generate an output signal. Thermocouples also are capable of operating in high vibration environments. However, thermocouples are less accurate than RTD devices.

A resistance temperature detector (RTD) senses temperature by a change in electrical resistance of a metal. The higher the temperature of the RTD, the higher the resistance. An output signal of the RTD sensor is generated by passing a constant electrical current through the RTD and measuring the voltage produced.

An RTD may be either a wire wound or a thin film device. The RTD may be encapsulated in a temperature probe and used in conjunction with an industrial process transmitter to generate a transmitter output representing the temperature of the fluid in contact with the probe. Platinum is commonly used in wire wound and thin film RTDs, and provides stable and accurate measurement of temperatures up to about 600° C. to 650° C.

When compared to thermocouples, RTD devices are capable of higher accuracy but have smaller overall temperature range. Also, RTD devices are more susceptible to damage or failure in high vibration environments than are thermocouples.

There is a need for a temperature sensor capable of operation in high vibration environments with the accuracy of an RTD and with a better high temperature range than is currently available with RTDs designed for high vibration environments.

SUMMARY

A temperature sensor includes a sensor sheath mounted at a distal end of a cable carrying electrical leads. An RTD sensing element positioned within the sheath is connected to leads from the cable. A ceramic thermal adhesive holds the RTD sensing element in place within the sheath.

DETAILED DESCRIPTION

Figure 1:
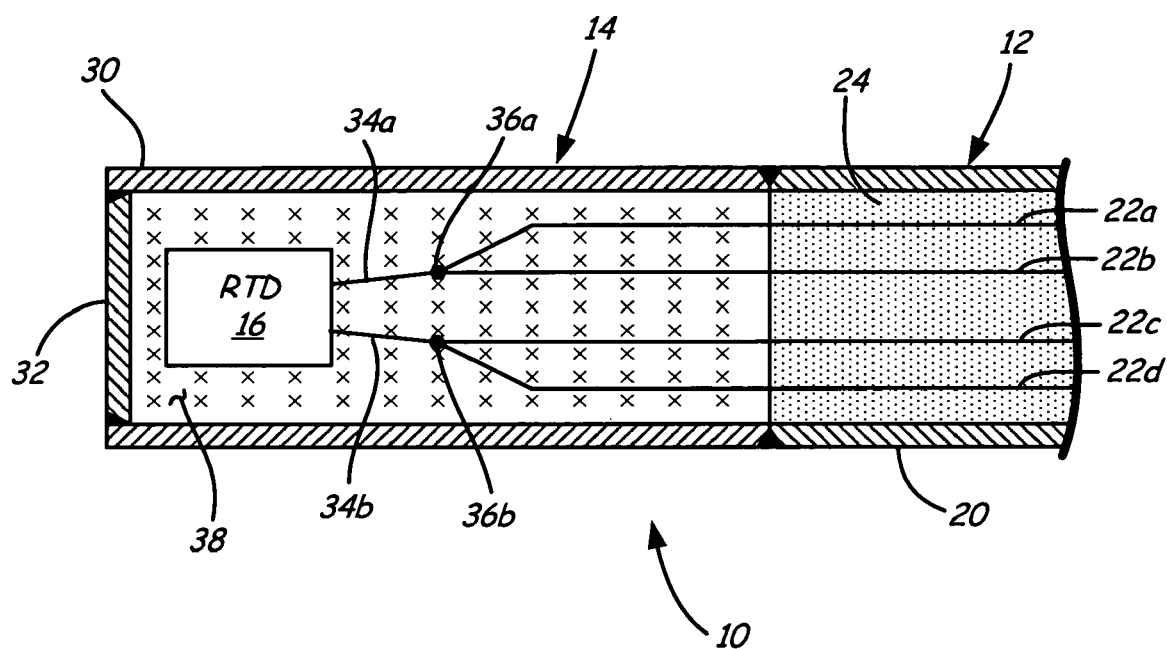
FIG. 1 is a cross-sectional view of a distal portion of the RTD temperature sensor of the present invention.

FIG. 1 is a cross-sectional view of a distal portion of RTD temperature sensor 10, which is capable of operating in high vibration environments, which provides improved high temperature performance. RTD sensor 10 includes mineral insulator (MI) cable 12, sheath 14, and RTD sensing element 16.

MI cable 12 extends from the proximal end (not shown) of RTD sensor 10 to sheath 14 at the distal end of RTD sensor 10. MI cable 12 includes outer tube 20, electrical leads 22a, 22b, 22c, and 22d, and a filling of a mineral insulator powder. In one embodiment, outer tube 20 is a metallic tube made of 321 stainless steel, leads 22a-22d are nickel leads, and mineral insulator filler 24 is magnesium oxide (MgO) powder.

Sheath 14 includes extension tube 30 and end cap 32. Distal end of extension tube 30 is welded to the distal end of tube 20. End cap 32 is welded to the distal end of extension tube 30 to close the distal end of sheath 14. In one embodiment, both extension tube 30 and end cap 32 are 316 stainless steel. In other embodiments, extension tube 30 may be formed of 316L, 321, or 316Ti stainless steel.

RTD sensing element 16 is positioned within sheath 14 near end cap 32. Leads 34a and 34b of RTD sensing element 16 extend in a proximal direction to make connection with leads 22a-22d of cable 12. Lead 34a of RTD sensing element 16 is connected to the distal ends of leads 22a and 22b by laser weld 36a. Lead 34b of RTD sensing element 16 is connected to the distal ends of cable leads 22c and 22d by laser weld 36b. In one embodiment, RTD sensing element 16 is a thin film RTD device, such as the HD-421 sensing element manufactured by Heraeus Sensor GmbH. In that embodiment, lead 34a and 34b are platinum leads. In other embodiments, wire wound RTD sensing elements may be used.

The interior of sheath 14 is filled with ceramic adhesive filler 38. In one embodiment, ceramic adhesive filler 38 is a two-component thermoepoxy Thermoguss 2000, which provides stable temperature performance up to about 450° C. In another embodiment, ceramic adhesive filler 38 is Cerastil V336, a two-component ceramic adhesive, which provides stable operation up to about 600° C.

Ceramic adhesive filler 38 must provide electrical insulation, stable characteristics up to the desired maximum temperature, and must prevent relative movement of RTD sensing element 16 and sheath 14. Ceramic adhesive filler 38 prevents relative movement by forming a rigid mass within sheath 14, so that RTD sensing element 16 cannot move relative to capsule 14 during vibration of RTD sensor 10.

In high vibration environments, the vibrational load on sensor 10 can exceed an acceleration of 100 m/s$^2$ at frequencies in range of 10 Hz to 500 Hz. In some cases, the acceleration can be up to 600 m/s$^2$ over the frequency range of 10 Hz to 500 Hz.

For operating temperatures up to about 450° C., Thermoguss 2000 ceramic adhesive provides the necessary vibration resistance and is a very good heat conductor. Cerastil V336 offers a higher operating range (up to 600° C.), but does not have as high a thermal conductivity as Thermoguss 2000. It is possible, however, to achieve enhanced temperature range and response times by using a combination of Cerastil V336 and Thermoguss 2000. In one embodiment, approximately two thirds of the interior of sheath 14 is filled with Cerastil V336, and one third of sheath 14 is filled with Thermoguss 2000. In that embodiment, the portion filled by Thermoguss 2000 is at the distal end, nearest RTD sensing element 16. Other combinations of layers of ceramic adhesives are also possible.

RTD sensor 10 is fabricated by laser welding leads 34a and 34b to leads 22a-22d that extend from the distal end of MI cable 12. Extension tube 30 is then placed over leads 22a-22d, leads 34a, 34b, and RTD sensing element 16 so that the proximal end of extension tube 30 abuts the distal end of tube 20 of cable 12. A laser welded butt joint is then formed between tube 20 and extension tube 30.

Ceramic adhesive filler 38 is then introduced into the interior of sheath 14 as defined by extension tube 30. End cap 32 has not yet been joined to extension tube 30, so that ceramic adhesive filler 38 can be introduced through the distal opening of sheath 14. Ceramic adhesive filler 38 may be allowed to cure and harden before end cap 32 is inserted into the distal opening and welded to extension tube 30.

Tests of RTD sensors in which the capsule was filled entirely with Cerastil V336 and in which the capsule was filled two thirds with Cerastil V336 and one third with Thermoguss 2000 showed satisfactory operation over a range from −60° C. to 600° C. The devices worked satisfactorily with loads of acceleration up to 600 m/s$^2$ in the range of 10 Hz to 500 Hz.

RTD sensors in which the entire capsule was filled with Thermoguss 2000 also provided satisfactory operation in vibrational loads of acceleration up to 600 m/s$^2$ in a range of frequency from 10 Hz to 500 Hz. The RTD sensors in which Thermoguss 2000 filled the entire capsule provided satisfactory stable temperature performance up to about 450° C.

Although the present invention has been described with reference to preferred embodiments, workers skilled in the art will recognize that changes may be made in form and detail without departing from the spirit and scope of the invention.

The invention claimed is:

1. A temperature sensor comprising:
   a mineral insulator cable having a metal outer tube;
   a sheath extending from a distal end of the mineral insulator cable, the sheath having a closed distal end, wherein the sheath includes a cylindrical metal sleeve having a proximal end abutting and metallically bonded to the distal end of the mineral insulator cable, and a metal end cap metallically bonded to a distal end of the sleeve, and wherein the sleeve has an outer diameter that is equal to an outer diameter of the outer tube of the mineral insulator cable;
   a resistance temperature detector (RTD) sensing element positioned within the sheath adjacent the closed distal end and electrically connected to electrical leads of the mineral insulator cable; and
   a first ceramic adhesive filling a first portion of the sheath; and
   a second ceramic adhesive filling a second portion of the sheath, such that the first and second ceramic adhesives surround the RTD sensing element.

2. The temperature sensor of claim 1, wherein the first and second ceramic adhesives protect the RTD sensor from damage due to vibration with acceleration up to at least 100 m/s$^2$ at frequencies in a range of 10 Hz to 500 Hz.

3. The temperature sensor of claim 2, wherein the first and second ceramic adhesives protect the RTD sensor from damage due to vibration with acceleration up to 600 m/s$^2$ at frequencies in a range of 10 Hz to 500 Hz.

4. The temperature sensor of claim 1, wherein the temperature sensor has an operating temperature range of about −60° C. to at least about 450° C.

5. The temperature sensor of claim 4, wherein the temperature sensor has an operating temperature of about −60° C. to at least about 600° C.

6. The temperature sensor of claim 1, wherein one of the first or second ceramic adhesive comprises Thermoguss 2000 adhesive.

7. The temperature sensor of claim 1, wherein one of the first or second ceramic adhesive comprises Cerastil V336 adhesive.

8. The temperature sensor of claim 1, wherein the first ceramic adhesive comprises Cerastil V336 adhesive, and the second ceramic adhesive comprises Thermoguss 2000 adhesive.

9. The temperature sensor of claim 1, wherein the sheath is formed of stainless steel.

10. The temperature sensor of claim 1, wherein the RTD sensing element comprises a thin film RTD device.

11. A method of making a temperature sensor, the method comprising:
    connecting a resistance temperature detector (RTD) sensing element to leads extending from a distal end of a cable having a metal outer tube;
    metallically bonding a proximal end of a thermally conductive cylindrical sleeve to the distal end of the cylindrical outer tube of the cable so that the RTD sensing element is located within an interior of the sleeve wherein outer diameters of the metal outer tube and the sleeve are equal;
    filling a first portion of the interior of the sleeve with a first ceramic adhesive introduced through an open distal end of the sleeve;
    filling a second portion of the interior of the sleeve with a second ceramic adhesive introduced through the open distal end of the sleeve; and
    metallically bonding and end cap to the distal end the sleeve to enclose the RTD sensing element and the ceramic adhesive within the sleeve.

12. The method of claim 11, wherein the first portion of the interior of the sleeve comprises a proximal portion of the interior of the sleeve, and the second portion of the interior of the sleeve comprises a distal portion of the interior of the sleeve.

13. The method of claim 11, wherein the first ceramic adhesive comprises Cerastil V336 adhesive, and the second ceramic adhesive comprises Thermoguss 2000 adhesive.

14. The method of claim 11, wherein the second ceramic adhesive is stable up to at least about 450° C.

15. The method of claim 14, wherein the second ceramic adhesive comprises Thermoguss 2000 adhesive.

16. The method of claim 11, wherein the first ceramic adhesive is stable up to at least about 600° C.

17. The method of claim 16, wherein the first ceramic adhesive comprises Cerastil V336 adhesive.

18. A temperature sensor comprising:
    a cable having a metal outer tube;
    a cylindrical sheath abutting a metallically bonded to a distal end of the metal outer tube of the cable, wherein outer diameters of the outer tube and the sheath are equal;
    a resistance temperature detector (RTD) sensing element positioned within the sheath capsule and electrically connected to the cable; and
    a first ceramic adhesive filling a proximal region of the sheath and a second ceramic adhesive filling a distal region of the sheath, so as to protect the RTD sensing element from vibration with acceleration of at least 100 m/s$^2$ at frequencies in a range of 10 Hz to 500 Hz and exhibiting thermal stability over a temperature range of −60° C. to at least 450° C.

19. The temperature sensor of claim 18, wherein the first ceramic adhesive exhibits thermal stability over a temperature range up to at least 600° C.

* * * * *

UNITED STATES PATENT AND TRADEMARK OFFICE
CERTIFICATE OF CORRECTION

| | |
|---|---|
| PATENT NO. | : 7,982,580 B2 |
| APPLICATION NO. | : 12/156144 |
| DATED | : July 19, 2011 |
| INVENTOR(S) | : Holger Weber, Ulrich Thiel and Willy Bauschke |

It is certified that error appears in the above-identified patent and that said Letters Patent is hereby corrected as shown below:

Col. 4, Line 26
  Delete "and"
  Insert --an--

Col. 4, Line 26
  Insert --of-- after "end cap to the distal end"

Signed and Sealed this
Nineteenth Day of February, 2013

Teresa Stanek Rea
*Acting Director of the United States Patent and Trademark Office*